(12) United States Patent
Niblack

(10) Patent No.: US 6,181,342 B1
(45) Date of Patent: Jan. 30, 2001

(54) COMPUTER FILE DIRECTORY SYSTEM DISPLAYING VISUAL SUMMARIES OF VISUAL DATA IN DESKTOP COMPUTER DOCUMENTS FOR QUICKLY IDENTIFYING DOCUMENT CONTENT

(75) Inventor: Carlton Wayne Niblack, San Jose, CA (US)

(73) Assignee: International Business Machines Corp., Armonk, NY (US)

(*) Notice: Under 35 U.S.C. 154(b), the term of this patent shall be extended for 0 days.

(21) Appl. No.: 09/110,529

(22) Filed: Jul. 6, 1998

(51) Int. Cl.[7] .......................................... G06F 7/00
(52) U.S. Cl. ............................ 345/356; 345/334; 345/349
(58) Field of Search .......................... 345/345, 346, 345/334, 349, 356, 968, 348, 335; 707/3, 4, 104

(56) References Cited

U.S. PATENT DOCUMENTS

| | | |
|---|---|---|
| 5,060,135 | 10/1991 | Levine et al. . |
| 5,479,602 | 12/1995 | Baecker et al. . |
| 5,579,471 * | 11/1996 | Barber et al. ......................... 345/326 |
| 5,623,681 | 4/1997 | Rivette et al. . |
| 5,715,416 | 2/1998 | Baker . |
| 5,731,813 | 3/1998 | O'Rourke et al. . |
| 5,752,244 * | 5/1998 | Rose et al. ............................. 707/5 |
| 5,765,176 * | 6/1998 | Blomberg ............................. 707/514 |

* cited by examiner

Primary Examiner—Raymond J. Bayerl
Assistant Examiner—Cao H. Nguyen
(74) Attorney, Agent, or Firm—John L. Rogitz

(57) ABSTRACT

A graphical user interface to desktop documents presents a visual display of visual summaries extracted from still image files, video image files, presentation slide documents, and word processing documents that include figures therein, in a computer file system, in response to a computer user requesting a directory listing. The user can select a visual summaries to cause the computer to search for files/documents containing similar images. The visual summaries can be presented in a hierarchy, with the top level of the hierarchy containing one visual summary per file/document, the next level containing visual summaries of all images in each file/document, and the lowest level containing visual summaries of each individual component, if any, in each image in a document. Further, for an alpha-numeric document having no images, the corresponding visual summary can be a visual representation of the appearance of a portion of the document, such as a portion of the first page of the document.

4 Claims, 5 Drawing Sheets

COMPUTER FILE DIRECTORY SYSTEM DISPLAYING VISUAL SUMMARIES OF VISUAL DATA IN DESKTOP COMPUTER DOCUMENTS FOR QUICKLY IDENTIFYING DOCUMENT CONTENT

BACKGROUND OF THE INVENTION

1. Field of the Invention

The present invention relates generally to desktop computer file systems, and more particularly to systems and methods for presenting effective lists of files in a file system of a desktop, laptop, or hand-held computer.

2. Description of the Related Art

Increasingly, desktop and laptop computers contain not only alpha-numeric documents, e.g., text-only documents made using a word processing application program such as WordPerfect® or Microsoft Word®, but documents and files that include visual data as well. By "visual data" is meant data that is not exclusively alpha-numeric. Accordingly, "visual data" includes scanned photographic images, computer- or human-generated art images, clip art, video frames, logos, banners, screen shots, Web pages, computer-generated presentation slides and other business graphics that are generated by applications such as Freelance®, Excel®, 1-2-3®, or PowerPoint®, and other genre of images. Such visual data can be contained in documents, by which is meant a data group that can include alpha numeric data that is intended to be edited using an associated application. Examples of such documents are slides made using the Power Point® graphics application marketed by Microsoft Corp., as well as word processing documents and email documents, which, despite being generally considered to contain only alpha-numeric text data, might nonetheless include embedded images that are stored as image data bits within the documents. Also, visual data can be contained in non-document image files that simply hold, e.g., photographic images. An example of a non-document image file is a gif-formatted file or .jpg-formatted file.

To access desktop files and documents, users of desktop and laptop computers invoke the files/documents by name. Often, a user cannot remember the exact name of a file or document, so the user requests a directory listing, which is a list of file directories in a file system or, on a lower hierarchical level, a list of files/documents in a particular directory. In response to the user's request, a directory list or file list is presented on the user's monitor.

Representative of existing directory list formats is the display that can be invoked using Microsoft's Windows NT Explorer®, which presents a list by name of directories on a left window of the screen, and a list by name of files/documents in a user-selected one of the directories, on a right window of the screen. The list of files/documents includes the names, along with information such as file/document type, size, and date of last edit. The user then scrolls through the list, which can include thousands of files/documents, until the user recognizes a name of a file/document the user desires to open.

As recognized herein, the above-described conventional directory list format has certain drawbacks. Specifically, it is frequently the case that a user might desire to recall a particular document that has been stored in the user's file system, but the user might not know the exact name of the file or document. The present invention recognizes, however, that if the document contains visual data, for example, is a Power Point® presentation or a text document with embedded images, the user might quickly recognize the document if the user could view a visual summary of the document, which unfortunately the user currently cannot conveniently do.

Consequently, to see easily recognizable visual data in files and documents, the user, as understood herein, would have to scroll through perhaps thousands of names on the list and sequentially open the files/documents until the visual datum being sought is found. This is time consuming and cumbersome. Nonetheless, it is the only means available for a user who, for example, desires to avoid creating a new presentation slide from scratch by instead creating a slide using a previously-generated slide that the user knows to be in the file system, but that might be stored under a name that the user cannot precisely recall. So-called thumbnail image browsers cannot remedy the above prior art shortfall, because thumbnail image browsers simply present a table of thumbnail images of images in non-document files formatted as, e.g., gif or jpg files. As stated above, such files make up only a fraction of the files and documents typically stored in a desktop file system. Additionally, thumbnail image browsers are not intended to and in fact do not provide the functionality of a directory listing GUI.

U.S. Pat. No. 5,060,135 discloses a data processing system that presents detailed miniaturized images of documents that are stackable on each other, for identification of documents by a user. The '135 system, however, is seemingly directed only to alpha-numeric (word processing) documents, and consequently does not address providing a GUI for a desktop system including image documents. Thus, among other things, the '135 system does not provide a means for easily searching for images that are similar to a desired image in a document. Moreover, the '135 patent does not provide an image-based GUI that is hierarchical in nature. As understood by the present invention, presenting an image content-based GUI that facilitates image searching and that is hierarchically based for ease of use is desirable. Likewise, U.S. Pat. No. 5,731,813 presents "snapshots" of screen displays in a seemingly non-hierarchical format, without the capability of image searching.

Fortunately, the present invention recognizes that visual data in file system documents can be used to present an effective, visual content-based directory list that a user can quickly scan to recall a particular visual datum, even if the user does not remember the associated name. Moreover, the present invention recognizes that it is possible to provide a directory list in which a user can identify a visual datum in a file system that contains visual data that is "close" to desired visual data and to cause similar visual data in the file system to be quickly and efficiently presented. The present invention also recognizes that it is possible to provide a natural multi-level hierarchy in presenting visual summaries of documents with visual data, from a single visual summary per document, to multiple visual summaries for each image of visual data instance in a document. Still further, the present invention recognizes that it is possible to provide a visual data-oriented directory list that can be combined with conventional file system features.

SUMMARY OF THE INVENTION

The invention is a general purpose computer programmed according to the inventive steps herein to present a graphical user interface (GUI) directory display on a monitor of a computer. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein.

In accordance with the present invention, the invention includes a computer incorporating a graphic user interface to desktop data or network-accessible data, with the data including at least some documents storing one or more respective visual data. The visual data can include images, graphs, charts, spreadsheets, slides, Web pages, word processing data with embedded images, videos, and the like. The computer includes computer readable code means for generating a respective visual summary of the visual data, such as thumbnails for images or filmstrips, animated images, or storyboards for video data. Computer readable code means are provided for receiving a user request for a listing of documents. In response to the user request, computer readable code means present a display including plural of the visual summaries presented simultaneously with each other.

In a preferred embodiment, computer readable code means receive a user request for visual data that is visually similar to a user-selected visual summary. In response, computer readable code means present visual summaries of similar visual data. The similar video data can be retrieved from the same directory, or from a set of directories, or indeed from the full set of files on the computer or network, as controlled by the user. Additionally, at least some of the visual summaries are associated with respective application programs, and the computer further includes computer readable code means for invoking an application program when a user selects the associated visual summary.

As disclosed in detail below, the visual summaries can be presented in a hierarchy. At least an upper level in the hierarchy includes a visual summary of a single visual datum in the respective document to represent the entire document. Additionally, at least a lower level in the hierarchy includes visual summaries of each visual datum, for example, each slide of a presentation or each figure in each of the documents. Moreover, because a single image or figure can be composed of multiple subimages such as clip art images, the hierarchy includes a lowest level including visual summaries of the individual subimages in the documents.

In accordance with the present invention, the files and documents for which visual summaries are generated include images, presentation slides, spreadsheet charts, saved Web pages, documents that incorporate figures, and other visual data noted above. Furthermore, the present invention envisions generating visual summaries for documents that include alpha-numeric data having no visual data. For these text-only documents, a respective visual summary is generated that is representative of the appearance of the document, for example, a reduced image of a portion of a first page of the document.

In another aspect, in a computer having access to a system of files or other database containing at least documents, and also having access to one or more input devices for generating user requests for one or more lists of documents in the file system, a system is disclosed for presenting, on a monitor associated with the computer, a display representative of the documents. The system includes computer readable means executable by the computer for presenting plural visual summaries on the monitor in response to the user requests. Per the present invention, the summaries are derived from the documents, unlike conventional icons, the particular visual appearances of which are not derived from documents. In other words, the visual summaries of the present invention, unlike conventional icons, are individually representative of the respective documents, that is, the visual summaries are not generic icons, but are derived from visual data in such as way so as to allow the user to recognize the visual summary as representing the parent visual data. The summaries may also represent additional document properties such as file type (word processing file, slide file, photographic image file, etc.), and size by image attributes such as type of border, corner tab, inset, etc.

In still another aspect, a computer-implemented method is disclosed for presenting a graphic user interface on a monitor of a computer. The present method includes extracting at least one visual summary per document for plural documents accessible to the computer, and then presenting the visual summaries on the monitor when a user of the computer generates a request for a list of computer documents. An application program associated with a document is invoked when a user of the computer associates one of the visual summaries with an application request.

In yet another aspect, a computer program device includes a computer program storage device that is readable by a digital processing apparatus. A program means is on the program storage device, and the program means includes instructions executable by the digital processing apparatus for performing method steps for presenting a graphical list of computer documents on a monitor of a computer. These method steps include generating a respective visual summary of at least a portion of at least some of the documents, and receiving a user request for a listing of documents. The method steps further include presenting a display in response to the receiving step, wherein the display includes plural of the visual summaries presented simultaneously with each other.

In another aspect, a computer program device includes program means on a program storage device that includes instructions which are executable by a digital processing apparatus for performing method steps for presenting visual data on a computer display as a list representative of computer documents containing the visual data. Importantly, the visual data are derived from the respective documents. A user request for visual data similar to a user-selected visual datum on the list is received, and at least portions of similar visual data are then presented in response to the user request. Moreover, an application is invoked in response to the selection of a visual datum.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
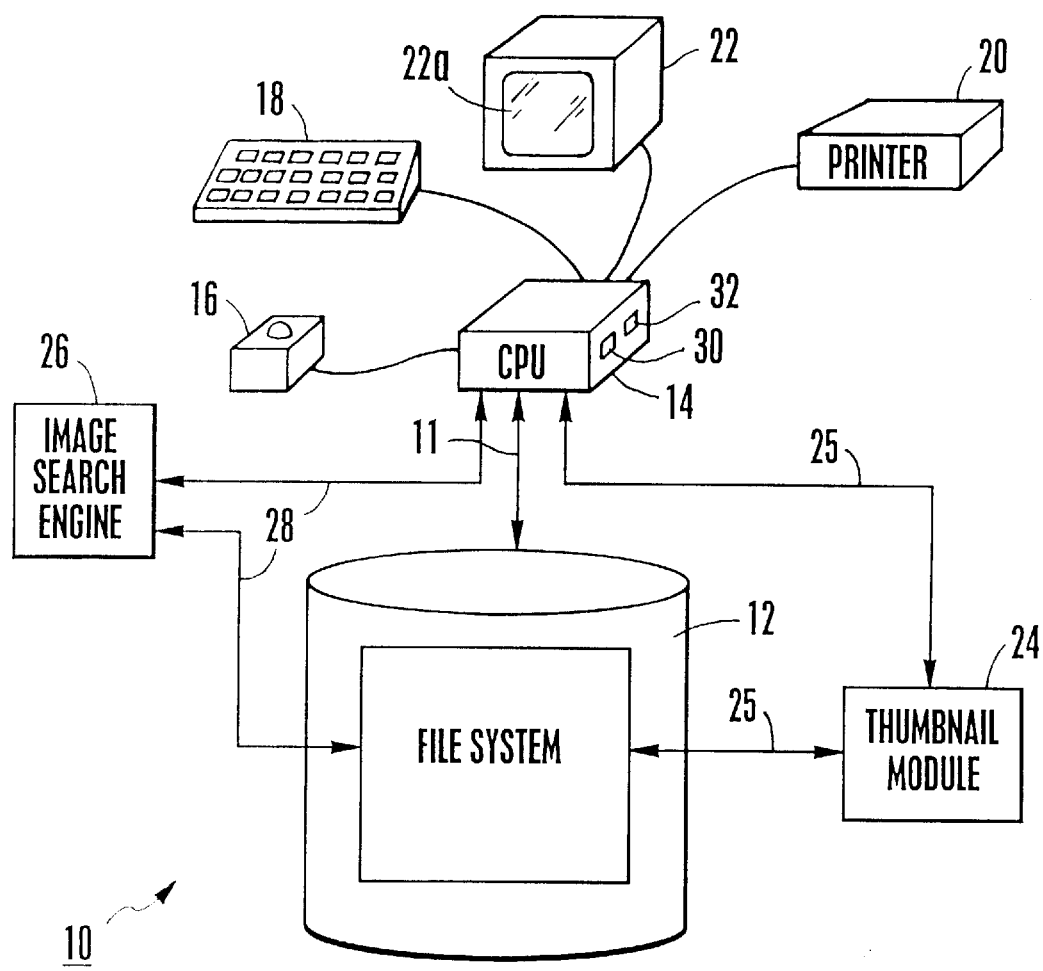
FIG. 1 is a schematic diagram showing the system of the present invention.

Referring initially to FIG. 1, a system is shown, generally designated 10, for accessing, via a path 11, a file system 12 for generating a graphical user interface (GUI) directory display. The file system may reside, for example, in desktop form that is local to a digital processing apparatus, such as a computer 14, in which case the file system 12 is internal to the computer 14 and the path 11 is an internal computer data bus. Or, the file system 12 can be remote from the computer 14, in which case the path 11 can be a local area network (LAN) or wide area network (WAN) such as the Internet and the file system is network-accessible. In one intended embodiment, the computer 14 is a desktop computer such as a personal computer or laptop computer made by International Business Machines Corporation (IBM) of Armonk, N.Y. Alternatively, the computer 14 may be any computer, including computers sold under trademarks such as AS400, with accompanying IBM Network Stations. Or, the computer 14 may be a Unix-based computer, or OS/2-based server computer, or Windows NT-based server computer, or IBM RS/6000 250 workstation or other equivalent device.

It is to be understood that while the embodiment described herein focusses on a desktop file system as a whole, the present invention can be incorporated in a single application program, e.g., a slide generation application program, in which case the files addressed by the present invention might not be the entire desktop file system that is accessible to the host computer, but rather the files associated with the particular application program incorporating the present invention.

As shown in FIG. 1, the computer 14 is electrically connected to one or more input devices, e.g., a mouse 16, a keyboard 18, or other input device such as a touchpad, trackball, or voice activated input device, which can be actuated by a user of the system 10 to generate requests for directory listings. The computer 14 also accesses one or more output devices such as a printer 20 and a monitor 22 that are conventionally coupled to the computer 14. It is to be understood that the monitor 22 is a cathode ray tube, flat panel display, or other appropriate visual display device. In any case, the present invention generates a GUI display for presentation on the screen 22a of the monitor 22.

In accordance with the present invention, the file system 12 is essentially a database that holds electronic files and documents of various types, including visual data documents (mixed text and visual documents), visual image files and text only documents. Visual data files are files that contain one or more images such as photographs or video frames, whereas visual data documents contain not only visual data such as images, drawings, presentation charts, and the like, but can contain editable alpha-numeric data as well. Text-only documents, in contrast, are documents such as word processing documents and text-only electronic mail (email) documents that generally do not contain data sets representative of visual data, such as images.

With the above in mind, a visual summary module 24 communicates with the file system 12 and computer 14 via data paths 25 to present, on the monitor 22, visual summaries derived from documents (and files) within the file system 12. The visual summary module 24 presents the visual summaries as a GUI display in response to a user generating a directory list request or document list request using the mouse 16 or keyboard 18. As intended herein, a visual summary is a digital image that is derived in accordance with principles known in the art from a parent visual datum, with the visual summaries containing a fraction of the information in the parent visual data. For example, commercial products are currently available that extract figures from documents, pages from slide presentations, and so forth, and store them as individual image files. From these, the present visual summaries can be made.

As a simple example, a visual summaries might contain only every third pixel in a parent visual datum. The visual summaries can be established by thumbnails for images or filmstrips, by animated images, or by storyboards or indeed portions of a word processing document page for other types of visual data.

Additionally, in the preferred embodiment an visual data search engine 26 communicates with the file system 12 and computer 14 via search paths 28. As disclosed in detail below, the visual data search engine 26 is a software-based search engine that receives a user-designated visual datum and in response searches for visual data that are similar to the user-selected datum. Preferably, the visual data search engine 26 includes the engine disclosed in U.S. Pat. No. 5,579,471, invented by the present inventor, owned by the present assignee, and incorporated herein by reference.

Figure 2:
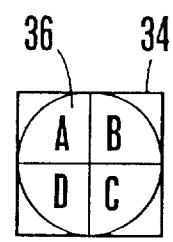
FIG. 2 is a schematic diagram showing a computer program product of the present invention.

It is to be understood that the control components such as the visual summary module 24 and visual data search engine 26 can be implemented in software contained in an appropriate electronic data storage, e.g., a hard disk drive 30 and/or optical disk drive 32, that are conventionally coupled to the computer 14. Or, the control components can be embodied in other logical components such as a computer diskette 34 shown in FIG. 2. The diskette 34 shown in FIG. 2 has a computer usable medium 36 on which are stored computer readable code means (i.e., program code elements) A–D.

The flow charts herein illustrate the structure of the visual summary module of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the visual summary module 24 may be a computer program that is executed by a processor within the computer 14 as a series of computer-executable instructions. In addition to the drives 30, 32, these instructions may reside, for example, in RAM of the computer 14, or the instructions may be stored on a DASD array, magnetic tape, electronic read-only memory, or other appropriate data storage device. In an illustrative embodiment of the invention, the computer-executable instructions may be lines of compiled $C^{++}$ compatible code.

Figure 3:
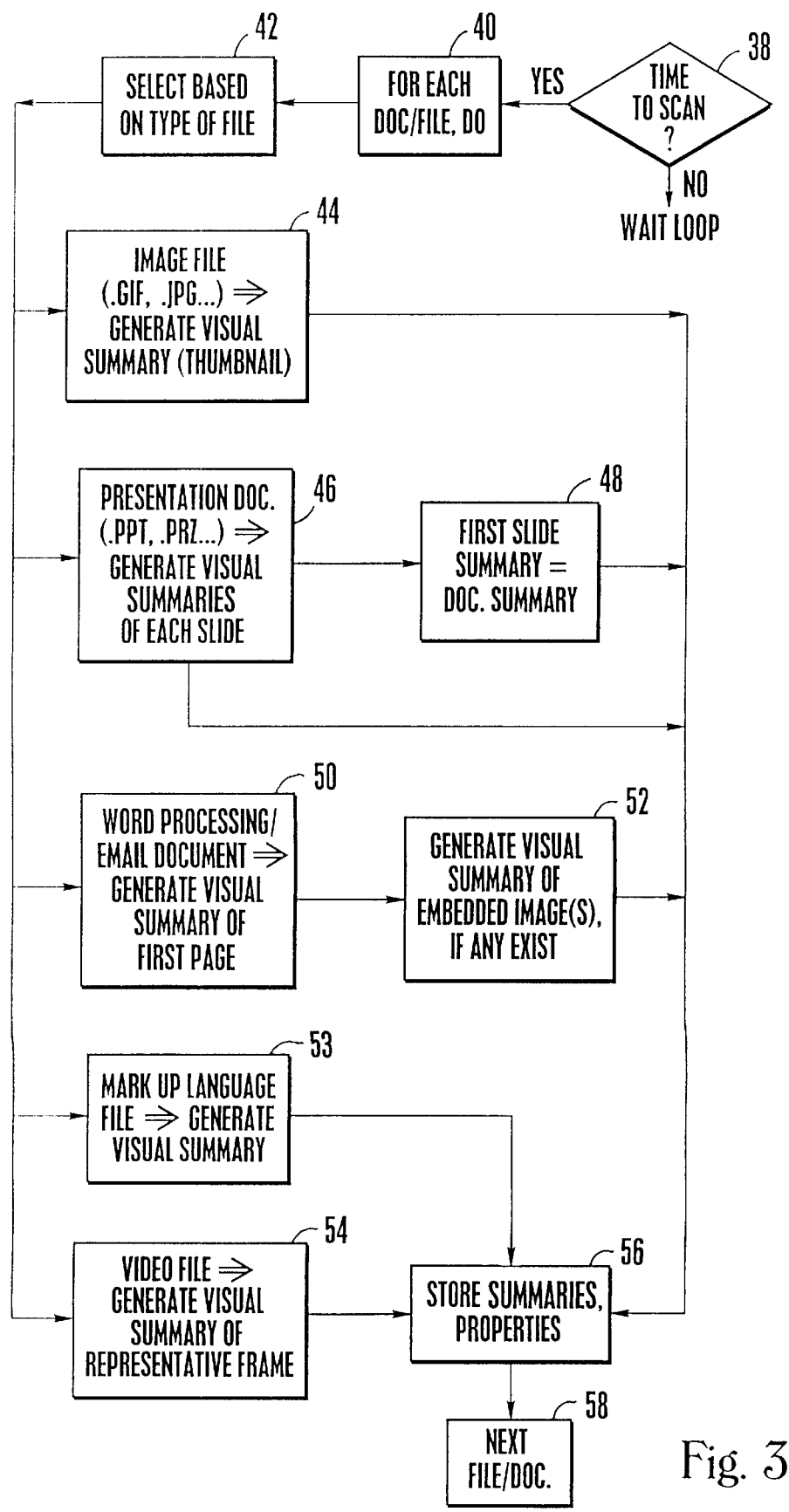
FIG. 3 is a flow chart showing the logic for generating visual summaries.

Now referring to FIG. 3, the logic used by the visual summary module 24 in generating visual summaries for use in the novel GUI display can be seen. Commencing at decision diamond 38, it is determined whether it is time to scan the file system 12 for newly added documents. Thus, the file system 12 is periodically monitored for new documents to update the GUI directory, and if the logic determines that it is time to scan the file system 12, the logic enters a "DO" loop at block 40 for each new document, i.e., for each document not previously considered by the visual summary module 24. It is to be understood that the visual summary module 24 alternatively can continuously update the GUI directory, if desired, in which case the "DO" loop at block 40 is entered each time a new document is created.

Proceeding to block 42, the logic determines what type of file or document the test document or file is. If it is an image file, e.g., a gif-formatted file or a jpg-formatted file, the logic moves to block 44 to generate a thumbnail of the image, in accordance with visual summary generation principles known in the art, as the visual summary of the underlying visual data in the file.

On the other hand, if the document is a presentation documents, e.g., a Microsoft Power Point®-formatted document or a Lotus Freelance®-formatted document, the logic moves to block 46 to generate thumbnail-like visual summaries of each slide in the document. The logic then moves to block 48 to designate one of the visual summaries to be a document visual summary that represents the file or document in the highest level of a visual summary hierarchy. In one preferred embodiment, the visual summary of the first visual datum in the file or document is designated as the file or document summary, although other designation schemes can be used. For example, the visual summary of the first or largest visual datum in the file/document can be designated as the file/document visual summary. In any case, the remaining visual summaries of the visual data in a file/document establish a second level in a visual summary hierarchy. The present invention understands that such a hierarchical system is natural for many image-based documents.

In contrast, if the document under test is a word processing document, the logic moves to block 50 to generate a visual summary that is representative of the appearance of the document. For example, if the document is a letter, the visual summary generated at block 50 might be an image of the top half of the first page, showing the letterhead of the document as well as the addressee. In any case, the actual appearance of each visual summary generated at block 50, like the appearances of the other visual summaries generated in accordance with present principles, is derived from the content of the document under test. From block 50, the process moves to block 52, wherein visual summaries are generated of any embedded images in the document.

Alternatively, the document/file under test might be a markup file, such as a hypertext markup (HTML) file, in which case the process moves to block 53 to generate a visual summary of the file. Or, the document/file under test might be a video file, in which case the process moves to block 54 to generate a visual summary of the file, e.g., a thumbnail of the first frame of the file, a thumbnail of every $100^{th}$ frame, etc.

After visual thumbnail generation, the logic moves to block 56 to store the visual summaries, along with the properties of the respective documents from which the visual summaries were derived and, if desired, predetermined text. The document properties can include document type (i.e., what type of application program was used to generate the document), date of last edit, and so on. The predetermined text can be alpha-numeric characters representing one or more of the document properties, with selected text being superimposed on the associated visual summary during presentation. Further, to the extent that certain data (e.g., meta data, search data, etc.) is required by the visual data search engine 26 during subsequent user-requested searches, such data can be stored with the visual summary at block 56. At block 58, the next new document is retrieved, and the process then loops back to decision diamond 42 as shown.

Figure 4:
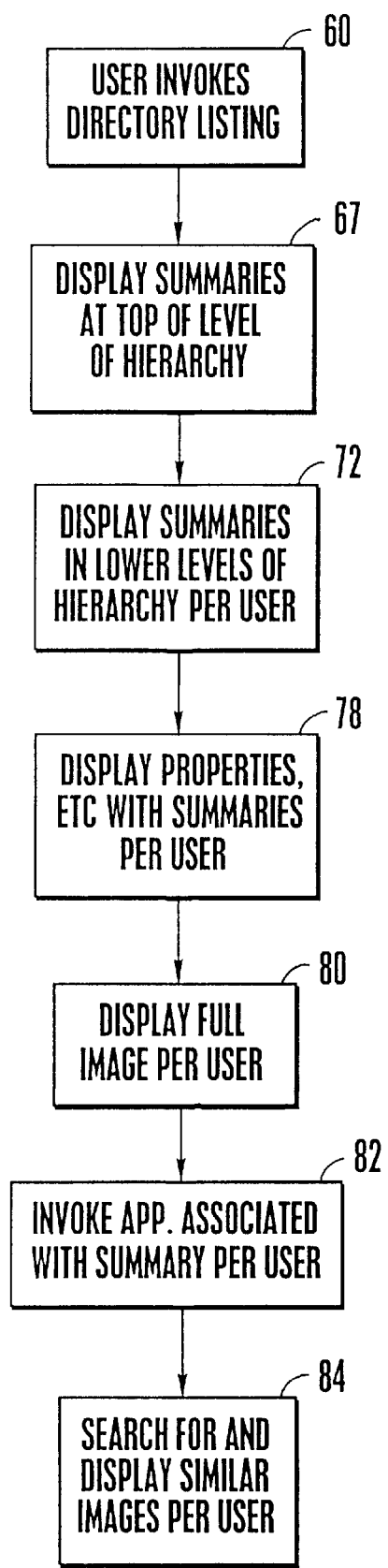
FIG. 4 is a flow chart showing the logic for presenting the present GUI display.
Figure 5:
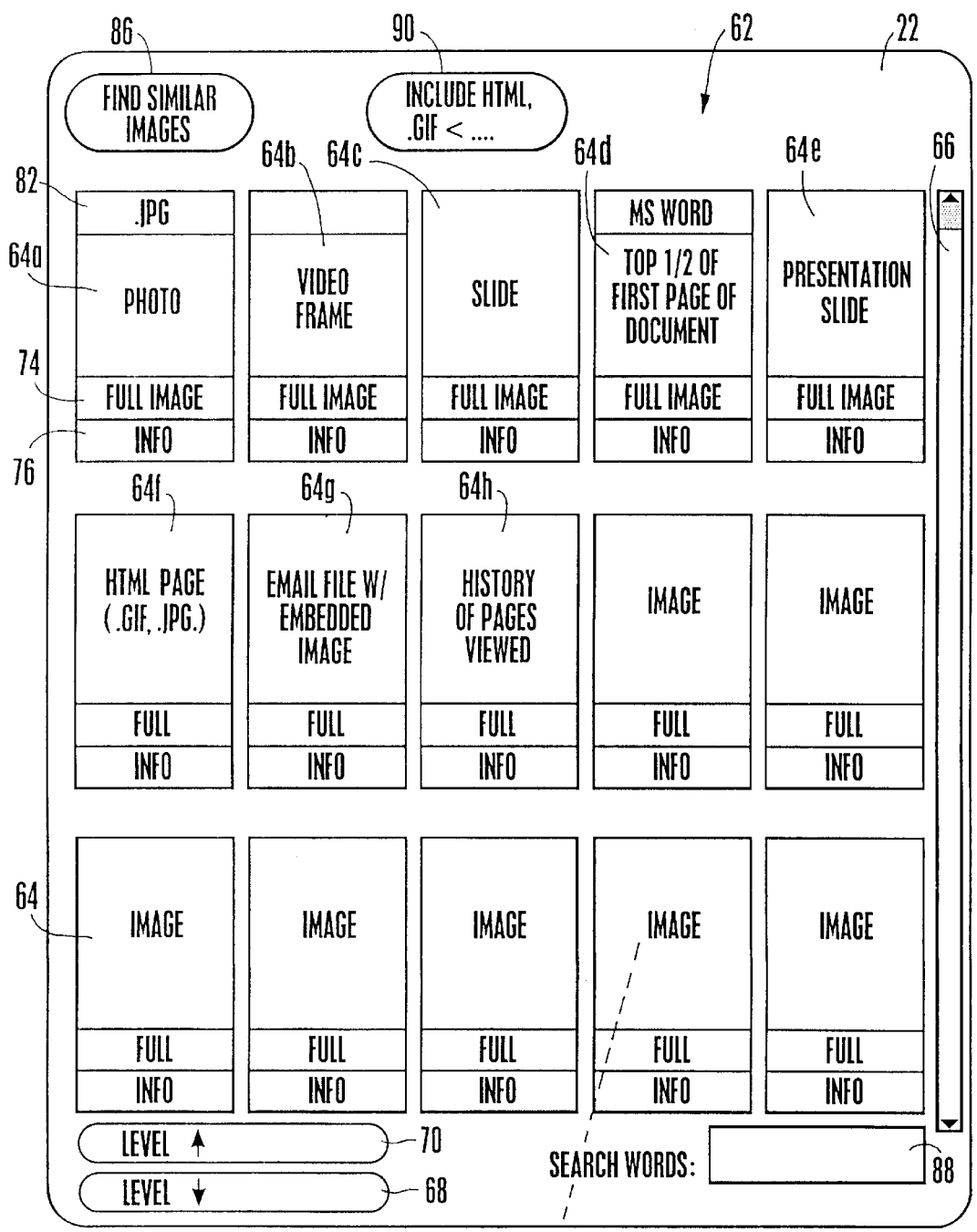
FIG. 5 is a diagram of one GUI display as would be seen on a computer display device.

Now referring to FIGS. 4 and 5, the presentation and operation of the GUI display can be appreciated. Having generated visual summaries of files and documents as described above, a user of the computer 14 can cause a graphic directory or list to be presented on the screen 22a of the monitor 22 as follows. At block 60 of FIG. 4, the user can invoke a directory listing using well-known principles by appropriately manipulating the mouse 16 or keyboard 18.

In response to the user request for one or more lists of directories and/or files/documents in the file system 12, the visual summary module 24 presents, on the monitor 22, a display representative thereof. Such a display is shown in FIG. 5 and generally designated 62. As shown, the display 62 is a GUI display that includes plural visual summaries 64 presented simultaneously with each other. As indicated in FIG. 5, a first one 64a of the visual summaries 64 is a visual summary of a digital photograph that has been stored in its associated document, while a second one 64b of the visual summaries 64 is a visual summary of a video frame from a digitally-stored video. Yet again, a third one 64c of the visual summaries 64 is a visual summary of a slide that has been stored in its associated document, while a fourth one 64d of the visual summaries 64 is a visual summary of the top half of the first page of a text-only document.

Still further, a fifth one 64e of the visual summaries 64 is a visual summary of a presentation slide that has been stored in its associated document, whereas a sixth one 64f of the visual summaries 64 is a visual summary of a hypertext markup language (HTML) page that has been, e.g., downloaded from the World Wide Web. A sixth visual summary 64g can be a visual summary of an embedded image in an email document, and a seventh visual summary 64h is a visual summary of a history of Web pages that have been viewed using the computer 14.

It may now be appreciated that a user viewing the GUI display shown in FIG. 5 can readily ascertain the nature of the visual data in each file/document by looking at the display 62. The user can quickly scroll through the visual summaries shown by using a scroll bar 66 on the display 62.

In the embodiment shown, a top level of visual summaries in a hierarchy is shown; accordingly, each visual summary 64 represents a respective document, with the highest level of visual summaries being initially displayed as indicated at block 67 in FIG. 4. If desired, the user can manipulate a level down button 68 to cause a set of visual summaries to be displayed that represents a second level of the hierarchy. In one preferred embodiment, the second level in the hierarchy includes visual summaries of each visual datum in a document or documents that are selected by the user, for example, each slide in a Microsoft Power Point® presentation, or each individual figure embedded in a Microsoft Word® document. To select the document or documents, the user can manipulate the mouse 16 to "click" on a visual summary or visual summaries in the highest level, with the next lower level of visual summaries in the hierarchy being displayed when the user clicks on the level down button 68.

The user can click yet again on the level down button 68 to cause yet a lowest level of visual summaries in the hierarchy to be presented. In one embodiment, the lowest level of visual summaries represent individual component images, i.e., subimages such as clip art, that make up a single figure. The lowest level of visual summaries is generated for each subimage of each document in the selected document or documents. As another example, a figure in a Word® document may be composed of several clip art images composed together, and this third level would display a visual summary of each individual clip art image. A level up button 70 is provided to enable a user to move from a lower level of visual summaries in the hierarchy to a higher level. The above-described steps are represented at block 72 in FIG. 4.

As shown in FIG. 5, each visual summary 64 includes a respective "full image" bar 74 and a respective "information" bar 76. A user can manipulate the mouse 16 to click on the "information" bar 76 to cause alpha-numeric file information, e.g., document name, date of last edit, and so on to be presented with the selected visual summary or superimposed on the visual summary 64, as indicated at block 78 in FIG. 4. In contrast, the user can click on the "full image" bar 74 of a visual summary 64 to cause the full visual datum from the associated document to be displayed at block 80 in FIG. 4. If desired, each visual summary 64 can include a respective document type header bar 82, indicating the type of document represented by the respective visual summary 64.

From block 80, the logic moves in response to user commands to blocks 82 and/or 84 in FIG. 4. More specifically, at block 82 a user can invoke an application program that had been used to create a document by double clicking or otherwise selecting the respective visual summary 64 in FIG. 5. In this way, the application program is invoked, and then the document associated with the selected visual summary 64 is opened by the application program, in an easy and user-friendly way. Additional document listing functionality can also be provided, e.g., by combining the display with conventional document sorts by date, or by size, or by name, and so on.

Also, if desired the user can select a visual summary 64 and then click on an image search button 86 on the display 62 to invoke the visual data search engine 26. As described in the above-referenced patent, the visual data search engine 26 accesses the file system 12 to search for and return, in order of similarity, visual data from files and documents in the file system 12 that are similar to the selected visual summary 64. The search can be restricted to images in the same directory, a set of directories, the full file system, or other set of files. These similar visual data are then presented on the display 62. With this logic, a user can identify a visual summary that is similar to a visual datum being sought that the user knows or suspects is stored in the file system 12, with similar visual data being returned to the user without requiring the user to scroll through the display 62. FIG. 5 shows that the above-mentioned image search feature can be combined with a word search window 88, whereby a user, in addition to selecting a visual datum to be matched as described above, can also input an alpha-numeric string for undertaking a conventional word search, in conjunction with the image search, to narrow the scope of the search.

If desired, a size limit button 90 can be provided on the display 62. A user can toggle the size limit button 90 to limit the size of documents, particularly HTML documents and gif-formatted documents, that are listed by means of the visual summaries 64 on the display 62.

FIG. 5 shows that alternatively to the "full image" bars 74 and "information" bars 76, a user can click on a visual summary 64 to cause a drop-down menu 92 to be displayed. As shown, the drop-down menu 92 can include a full image button 94 and an information button 96 that are analogous to the bars 74, 76 discussed above. Also, an image search button 98 can be provided on the menu 92, in lieu of the search button 86, and a text search button 100 can be provided in lieu of the word search window 88.

Additional file system functionality can be invoked using the menu 92. For example, an "open" button 102 can be selected to open a file/document. Furthermore, a cut/copy button 104, delete button 106, and rename button 108 can be provided to function in accordance with conventional principles. If desired, additional file system functionality can be provided using, e.g., the menu 92.

Figure 6:
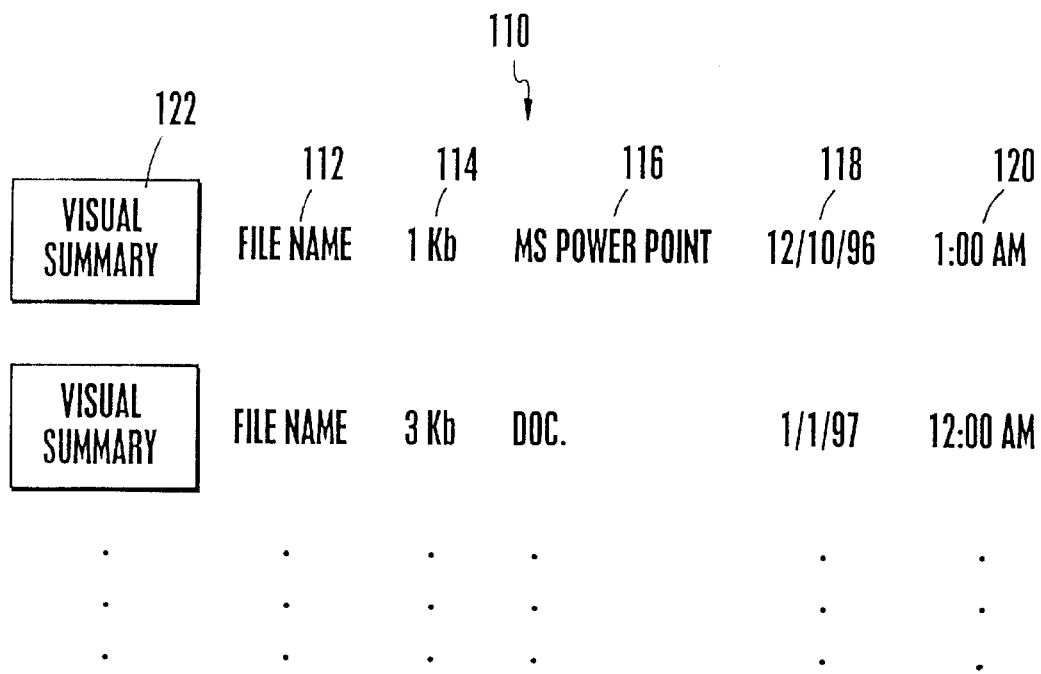
FIG. 6 is a diagram of an alternate GUI display as would be seen on a computer display device.

FIG. 6 shows a GUI display, generally designated 110, that is configured differently than the display 62 shown in FIG. 5. More specifically, as shown the display 110 in FIG. 6 lists conventional alpha-numeric file/document data, including name in a name column 112, size in a size column 114, file/document type in a type column 116, date of last edit in a date column 118, and time of last edit in a time column 120. In each file/document row, however, a respective visual summary 122 is presented in accordance with the principles set forth herein. A visual summary 122 can be selected to open the associated file/document, or to display a menu such as the menu 92 shown in FIG. 5.

While the particular COMPUTER FILE DIRECTORY SYSTEM DISPLAYING VISUAL SUMMARIES OF VISUAL DATA IN DESKTOP COMPUTER FILES FOR QUICKLY IDENTIFYING FILE CONTENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one" unless otherwise recited.

I claim:

1. In a computer having access to a file system of documents and one or more input devices associated with the computer for generating user requests for one or more lists of documents in the file system, a system for presenting, on a monitor associated with the computer, a display representative of the documents, comprising:

computer readable means executable by the computer for presenting plural images on the monitor in response to the user requests, the images being derived from the documents, wherein the images are visual summaries of file system images having associated documents, and wherein the visual summaries can be presented in a hierarchy, at least an upper level in the hierarchy including a visual summary of a single representative image in the respective document, at least a lower level in the hierarchy including plural visual summaries of respective plural images other than the representative image in the respective document.

2. The system of claim 1, further comprising computer readable code means for causing the computer to retrieve images similar to a selected image.

3. The system of claim 1, wherein the lower level includes a visual summary of each image in the respective document, and wherein the hierarchy includes a lowest level including visual summaries of at least one component image in at least one image in the respective document.

4. The system of claim 3, wherein the documents include images, presentation slides, spreadsheet charts, saved Web pages, and documents that incorporate figures.

\* \* \* \* \*

UNITED STATES PATENT AND TRADEMARK OFFICE
CERTIFICATE OF CORRECTION

PATENT NO.   : 6,181,342 B1
DATED        : January 30, 2001
INVENTOR(S)  : Niblack Page 1 of 1

It is certified that error appears in the above-identified patent and that said Letters Patent is hereby corrected as shown below:

<u>Title page,</u>
Name of Assignee: International Business Machines Corporation
Residence: Armonk, New York Signed and Sealed this Twenty-fifth Day of December, 2001

Attest:

Attesting Officer

JAMES E. ROGAN
Director of the United States Patent and Trademark Office